United States Patent
Morrison et al.

(10) Patent No.: US 8,247,062 B2
(45) Date of Patent: *Aug. 21, 2012

(54) METHODOLOGY AND TOOLING ARRANGEMENTS FOR INCREASING INTERLAMINAR SHEAR STRENGTH IN A CERAMIC MATRIX COMPOSITE STRUCTURE

(75) Inventors: Jay A. Morrison, Oviedo, FL (US); Gary B. Merrill, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 399 days.

This patent is subject to a terminal disclaimer.

(21) Appl. No.: 12/464,543

(22) Filed: May 12, 2009

(65) Prior Publication Data

US 2010/0291348 A1 Nov. 18, 2010

(51) Int. Cl.
 B32B 3/00 (2006.01)
 B32B 5/12 (2006.01)
 F04D 29/00 (2006.01)
 F03B 3/00 (2006.01)
(52) U.S. Cl. ..... 428/156; 428/113; 428/114; 428/293.4; 415/200; 416/236 R; 416/241 B
(58) Field of Classification Search ............ 428/111, 428/113, 114, 156, 172, 210, 293.4; 60/753, 60/755, 806; 415/38, 197, 200; 416/97 R, 416/229 R, 236 A, 236 R, 241 B
See application file for complete search history.

(56) References Cited

U.S. PATENT DOCUMENTS

| | | | |
|---|---|---|---|
| 5,668,344 A * | 9/1997 | Bornstein | 89/36.02 |
| 5,902,756 A * | 5/1999 | Aly et al. | 442/239 |
| 6,617,013 B2 | 9/2003 | Morrison et al. | |
| 6,746,755 B2 | 6/2004 | Morrison et al. | |
| 6,984,277 B2 | 1/2006 | Morrison et al. | |
| 7,153,096 B2 | 12/2006 | Thompson et al. | |
| 7,247,002 B2 | 7/2007 | Albrecht et al. | |
| 7,255,535 B2 | 8/2007 | Albrecht et al. | |
| 7,387,758 B2 | 6/2008 | Merrill et al. | |
| 2003/0059577 A1 | 3/2003 | Morrison et al. | |
| 2004/0253391 A1* | 12/2004 | Sugiyama et al. | 428/32.6 |
| 2005/0022921 A1 | 2/2005 | Morrison et al. | |
| 2006/0120874 A1 | 6/2006 | Burke et al. | |
| 2006/0182971 A1 | 8/2006 | Merill et al. | |
| 2007/0116939 A1* | 5/2007 | Benitsch et al. | 428/292.1 |
| 2009/0071160 A1 | 3/2009 | Keller et al. | |

\* cited by examiner

*Primary Examiner* — Donald J Loney

(57) ABSTRACT

Methodology and tooling arrangements for increasing interlaminar shear strength in a ceramic matrix composite (CMC) structure are provided. The CMC structure may be formed by a plurality of layers of ceramic fibers disposed between a top surface and a bottom surface of the composite structure. A plurality of surface recesses are formed on the surfaces of the structure. For example, each of the surfaces of the composite structure may be urged against corresponding top and bottom surfaces of a tool having a plurality of asperities. The plurality of surface recesses causes an out-of-plane sub-surface fiber displacement along an entire thickness of the structure, and the sub-surface fiber displacement is arranged to increase an interlaminar shear strength of the structure.

10 Claims, 2 Drawing Sheets

METHODOLOGY AND TOOLING ARRANGEMENTS FOR INCREASING INTERLAMINAR SHEAR STRENGTH IN A CERAMIC MATRIX COMPOSITE STRUCTURE

FIELD OF THE INVENTION

The present invention is generally related to ceramic matrix composite (CMC) structures for use in a high temperature combustion environment, and, more particularly, to tooling arrangements and/or techniques for increasing interlaminar shear strength of the CMC structure.

BACKGROUND OF THE INVENTION

Components made from CMC materials permit higher operating temperatures than do metal alloy materials due to the properties of ceramic materials. One example of a high temperature operational environment occurs in state of the art turbine engine applications. The high temperature capability results in reduced cooling requirements, which results in higher power, greater efficiency, and/or reduced emissions from the engine. Conventional CMC components formed from two-dimensional fiber arrangements have sufficient in-plane strength, but may lack sufficient shear strength to carry interlaminar shear loads.

BRIEF DESCRIPTION OF THE DRAWINGS

The invention is explained in the following description in view of the drawings that show.

DETAILED DESCRIPTION OF THE INVENTION

In accordance with one or more embodiments of the present invention, structural arrangements for fabricating a ceramic matrix composite (CMC) structure are described herein. In the following detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

The inventors of the present invention propose structural arrangements and techniques designed to increase interlaminar shear strength of a CMC structure. Aspects of the present invention propose tooling arrangements and/or methodology innovatively adapted to introduce an out-of-plane fiber displacement arranged to increase the interlaminar shear strength of the CMC structure.

Figure 1:
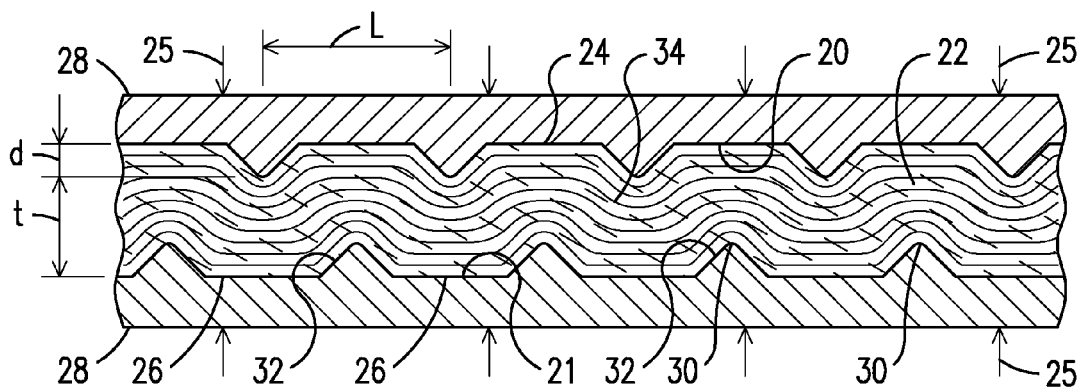
FIG. 1 is a cross sectional view of a tooling arrangement configured in accordance with aspects of the present invention to increase interlaminar shear strength in a CMC structure.

As shown in FIG. 1, respective surfaces 20 and 21 (e.g., top and bottom surfaces of a CMC structure 22 may be urged (e.g., by way of a mechanism that produces a pressure force, as schematically represented by arrows 25) against corresponding top and bottom surfaces 24 and 26 of a tool 28, as may have a plurality of asperities 30 arranged in accordance with a predefined pattern.

As a result of the urging (e.g., pressure force) applied by the surfaces of the tool against the top and bottom surfaces of the CMC structure, the asperities 30 form a plurality of surface recesses 32 on the surfaces 20 and 21 of the CMC structure. As shown in FIG. 1, the plurality of surface recesses 32 introduce an out-of-plane displacement to fibers 34. This out-of-plane fiber displacement essentially provides a reinforcement arranged to increase the interlaminar shear strength of the CMC structure. That is, the surface recesses 32 create bulk effects within the CMC structure conducive to increasing the interlaminar shear strength of the CMC structure. For example, in a CMC structure embodying aspects of the present invention, the interlaminar shear stress may be advantageously transferred through fiber reinforced plies (resulting from the out-of-plane fiber displacement) rather than just through the matrix phase of the CMC structure.

Figure 2:
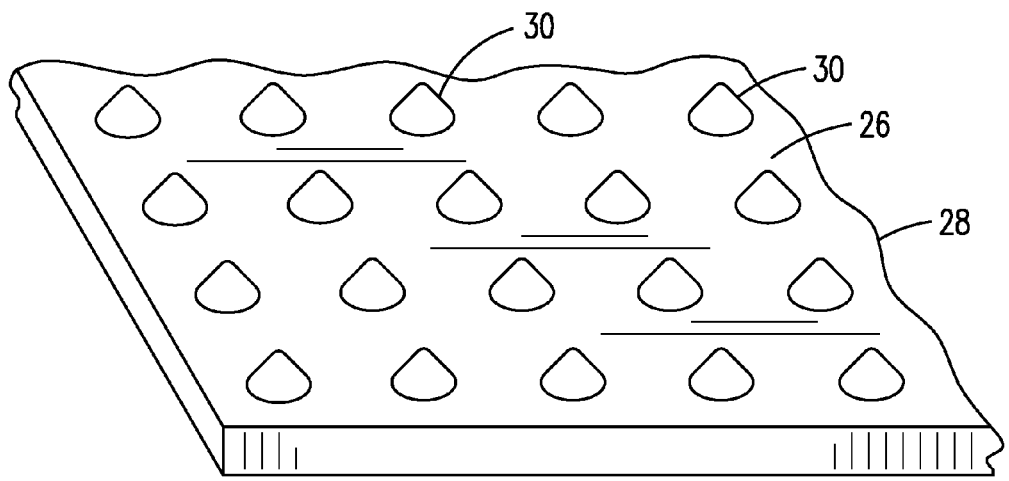
FIG. 2 is an isometric view of an example distribution of asperities disposed on a surface of the tool.

For simplicity of illustration just the bottom surface of the tool is shown in the isometric view shown in FIG. 2. It will be appreciated, however, that the asperities may be distributed over the top and bottom surfaces of the tool with a geometric arrangement (e.g., staggered arrangement) configured to produce a predictable out-of-plane fiber displacement, e.g., sinusoidal out-of-plane fiber displacement. In one example embodiment, every layer of the composite structure may include the out-of-plane displacement, such as an undulated out-of-plane displacement.

In a practical embodiment, the urging force may correspond to a laminate consolidation pressure normally applied during a laminate (e.g., inter-layer) consolidation stage—usually a pressure that in one example embodiment may range from approximately 10 psi to approximately 200 psi. Furthermore, such consolidation normally may be applied by standard tooling (e.g., hard plates) on each side of the laminate. Thus, it is contemplated that a tooling arrangement embodying aspects of the present invention may be integrated into the standard tooling used for consolidation. Thus it is believed that aspects of the present invention do not entail a post-consolidation process step or adding extra manufacturing steps. It will be appreciated that the values of the consolidation pressure may be adjusted based on the needs of a given application, e.g., size and/or pattern of features.

Example variations in the tooling arrangement may include the distribution, spacing, pattern, and depth of the recesses or tooling asperity features. Although example penetration depths explored so far (e.g., ranging from approximately 0.5 mm to approximately 5 mm) and spacing (e.g., ranging from approximately 3 mm to approximately 15 mm) have proven effective, it is contemplated that tooling arrangements that may include pattern variations and/or random depth variation may further strengthen the resistance against interlaminar shear.

As shown in FIG. 1, dimension d represents an example asperity height, (e.g., asperity height relative to a corresponding tool surface, and, thus d corresponds to an example surface recess depth), dimension L represents an example spacing distance between adjacent asperities and dimension t represents an example CMC structure thickness, as may be compensated (e.g., reduced) by asperity height d. In one example embodiment, a depth d of the surface recesses may be based on thickness t of the structure. An example range for the depth d of the surface recesses may be from 10 to 50 percent of thickness t of the CMC structure.

In another example embodiment, distance L (i.e., spacing between adjacent surface recesses) may be based on thickness t of the structure. An example range for distance spacing L may be from 150 to 500 percent of thickness t of the CMC structure. The distance L may be further based on a depth d of the surface recesses. In this case, an example range for distance L may be from 300 to 1000 percent of the depth d of the adjacent surface recesses.

Figure 3:
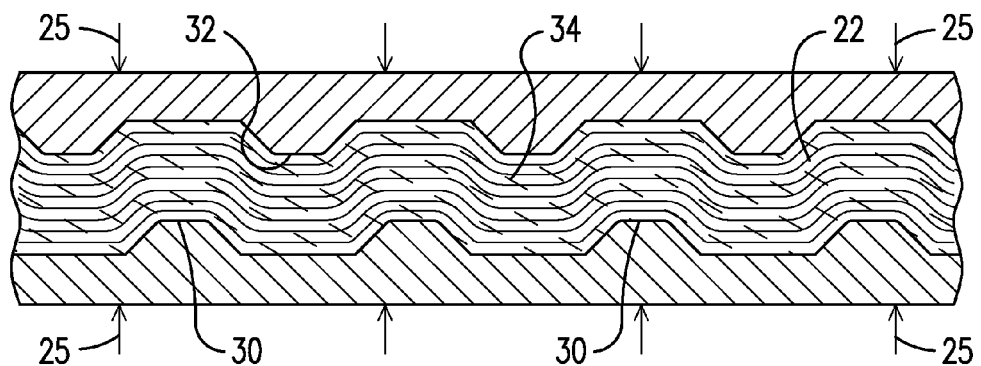
FIGS. 3 and 4 are respective cross sectional views of respective embodiments regarding example discrete shapes of tool asperities.
Figure 4:
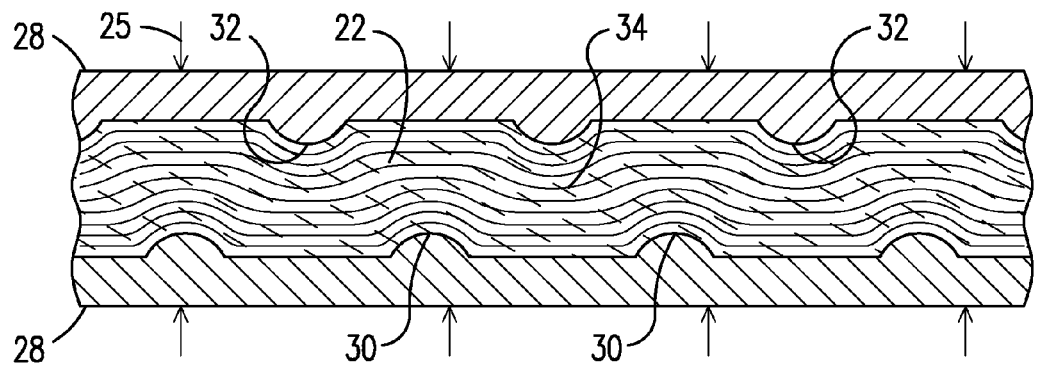
Figure 5:
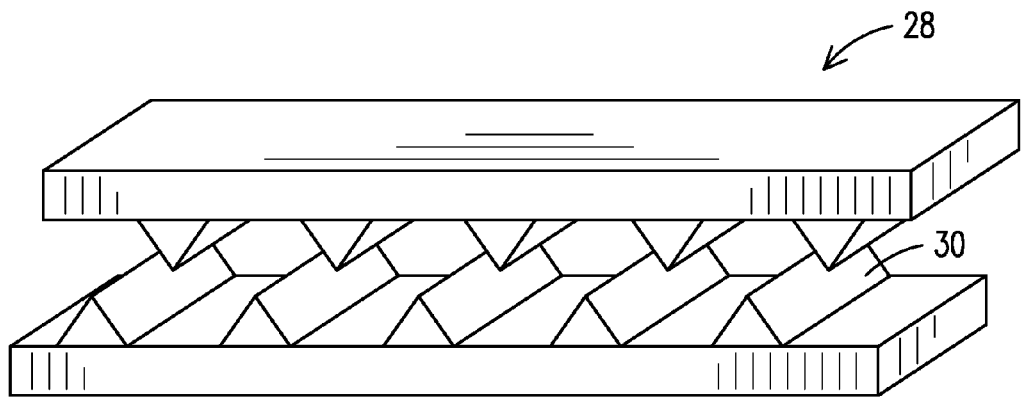
FIGS. 5 and 6 are respective isometric views of respective further embodiments regarding example structural characteristics of elongated tool asperities
Figure 6:
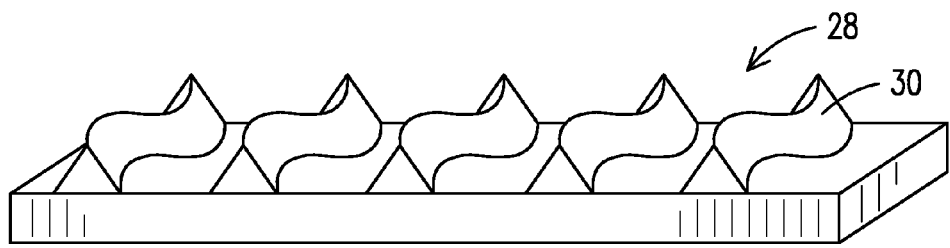

In the case of discrete asperities, various types of asperity shapes are contemplated. For example, pyramidal-shapes as shown in FIG. 1, truncated pyramidal shapes as shown in FIG. 3, and spheroidal shapes as shown in FIG. 4. It will be appreciated that the asperity arrangement and corresponding surface recesses need not be made up of discrete features. For example, it is contemplated that the asperity arrangement and corresponding surface recesses could be made up of elongated features, e.g., linear features as shown in FIG. 5 or serpentine features as shown in FIG. 6), as may extend over the top and bottom surfaces of the CMC structure.

It will be appreciated that in accordance with aspects of the present invention, the urging (e.g., pressure force) applied by the surfaces of the tool against the top and bottom surfaces of the CMC structure is arranged to gently and generally uniformly distort the plies (e.g., bulk sinusoidal distortion) throughout the thickness of the CMC structure—thereby reducing or avoiding any potential breakage or cutting damage to fibers and any consequent reduction in the in-plane (fiber dominated) behavior. Thus, it will be appreciated, that this urging is different than what would be required if one desired to introduce localized fiber breakage and/or cutting for improving surface coating adhesion, for example.

While various embodiments of the present invention have been shown and described herein, it will be understood that such embodiments are provided by way of example only. Numerous variations, changes and substitutions may be made without departing from the invention herein. Accordingly, it is intended that the invention be limited only by the spirit and scope of the appended claims.

The invention claimed is:

1. A ceramic matrix composite structure in a turbine engine component, the structure comprising:
    a plurality of layers of ceramic fibers disposed between a top surface and a bottom surface of the composite structure; and
    a plurality of surface recesses formed on the surfaces of the structure, wherein the plurality of the surface recesses causes an out-of-plane sub-surface fiber displacement along an entire thickness of the structure, wherein the sub-surface fiber displacement is arranged to increase an interlaminar shear strength of the structure in a high-temperature combustion environment of the turbine engine component.

2. The structure of claim 1, wherein a depth of the surface recesses is based on a thickness of the structure, wherein the depth of the surface recesses comprises from 10 to 50 percent of a thickness of the CMC structure.

3. The structure of claim 1, wherein a depth of the surface recesses ranges from approximately 0.5 mm to approximately 5 mm.

4. The structure of claim 1, wherein a distance spacing between adjacent surface recesses is based on a thickness of the structure, wherein the distance spacing between adjacent surface recesses comprises 150 to 500 percent of a thickness of the CMC structure.

5. The structure of claim 1, wherein the distance spacing between adjacent surface recesses is further based on a depth of the surface recesses, wherein the distance spacing between adjacent surface recesses comprises 300 to 1000 percent of the depth of said adjacent surface recesses.

6. The structure of claim 1, wherein a distance spacing between adjacent surface recesses ranges from approximately 3 mm to approximately 15 mm.

7. The structure of claim 1, wherein the surface recesses comprise discrete surface recesses.

8. The structure of claim 1, wherein the surface recesses comprise respective linearly extending recesses.

9. The structure of claim 1, wherein the surface recesses comprise respective serpentinely extending recesses.

10. The structure of claim 1, wherein the plurality of top and bottom surface recesses are arranged with respect to one another to establish a staggered arrangement configured to produce a sinusoidal out-of-plane fiber displacement.

* * * * *